United States Patent
Kokal et al.

(10) Patent No.: US 7,590,710 B1
(45) Date of Patent: Sep. 15, 2009

(54) METHOD AND SYSTEM FOR EXTENDING A COMMUNICATION PORT VIA A GENERAL PURPOSE NETWORK

(75) Inventors: James Vincent Kokal, Plano, TX (US); James Henry Price, Dallas, TX (US); Mark Alan Smith, Dallas, TX (US); Joseph James Pautler, Richardson, TX (US)

(73) Assignee: Wavetrix, Inc., Richardson, TX (US)

( * ) Notice: Subject to any disclaimer, the term of this patent is extended or adjusted under 35 U.S.C. 154(b) by 824 days.

(21) Appl. No.: 10/870,251

(22) Filed: Jun. 17, 2004

(51) Int. Cl.
*G06F 15/16* (2006.01)

(52) U.S. Cl. ............... 709/219; 709/203; 709/217; 709/218; 709/227; 709/229; 713/182; 713/169; 713/155

(58) Field of Classification Search ............. 709/231, 709/219; 710/11
See application file for complete search history.

(56) References Cited

U.S. PATENT DOCUMENTS

| | | | | |
|---|---|---|---|---|
| 4,811,284 | A * | 3/1989 | Adler et al. | 710/56 |
| 6,047,319 | A * | 4/2000 | Olson | 709/223 |
| 6,601,086 | B1 | 7/2003 | Howard et al. | 709/203 |
| 7,257,837 | B2 * | 8/2007 | Xu et al. | 726/12 |
| 2003/0009689 | A1 * | 1/2003 | Kolb | 713/201 |
| 2003/0101294 | A1 * | 5/2003 | Saint-Hilaire et al. | 710/11 |
| 2003/0191843 | A1 * | 10/2003 | Balissat et al. | 709/227 |
| 2004/0006620 | A1 | 1/2004 | Howard et al. | 709/224 |
| 2004/0081101 | A1 * | 4/2004 | Bennett | 370/252 |
| 2004/0230323 | A1 * | 11/2004 | Glanzer et al. | 700/18 |
| 2005/0080915 | A1 * | 4/2005 | Shoemaker et al. | 709/231 |
| 2005/0102514 | A1 * | 5/2005 | Bergenwall et al. | 713/168 |
| 2005/0138373 | A1 * | 6/2005 | Clark et al. | 713/166 |
| 2007/0213042 | A1 * | 9/2007 | Amiens | 455/420 |

OTHER PUBLICATIONS

Compaq Computer Corporation, "Compaq TCP/IP Services for Open VMS", Jan. 2001.*
Robinson, "RFC 935—Reliable Link Layer Protocols", Jan. 1985.*
Braden, "Requirements for Internet Hosts—Communication Layers", Oct. 1989.*
LMI's Industrial Data Acquisition and Control Application; pp. 2; www.emware.com.

(Continued)

*Primary Examiner*—Thuha T. Nguyen
*Assistant Examiner*—O. C Vostal
(74) *Attorney, Agent, or Firm*—Geoffrey A. Mantooth; Brian K. Yost

(57) ABSTRACT

A system for extending the operation of a local communications port of a client computer includes a central server, a client communication module, and a remote communication device, each connected to a communication network. A method of operating a central server in a communications network begins with establishing a first communication link between the central server and a remote communication device in response to a request from the remote communication device. A second communication link is established between the central server and a client communication module in response to a request from the client communication module. Application data is received from the client communication module via the second communication link and forwarded, via the first communication link, to the remote communication device. Remote equipment data is received from the remote communication device via the first communication link and forwarded, via the second communication link, to the client communication module.

27 Claims, 4 Drawing Sheets

OTHER PUBLICATIONS

Device Server Solution Guide; Winter/Spring 2002; pp. 9; Digi Connectware; www.digi.com.

PortStore-RS-232/Ethernet Buffer; pp. 7; HW Group; www.hwgroup.cz.

Managing Subnets via TCP/IP; pp. 2; emWare Products; www.emware.com.

HTTP Tunnel Client; 2004; pp. 2; www.http-tunnel.com.

Manage Your Equipment Remotely and Improve Your Service Operations; 2003; pp. 3; Deviceview; www.emware.com.

Constellation Data Systems, Inc.; pp. 4; www.virtualperipherals.com.

Introducing Com Port Redirector; pp. 5;Com Port Redirector User Guide Lantronix; Revision A Nov. 2003; Irvine, CA; www.lantronix.com.

Lisa Phifer; GoToMyPC: Making Life Simpler for Teleworksers and Travelers; 1997-2004; pp. 7; Citrix Online; Citrix Systems, Inc.

Lisa Phifer; GoToMyPC: Security; 1997-2004; pp. 10; Citrix Online; Citrix Systems, Inc.

GoToMyPC: Remote-Access Technologies; A Comparison of GoToMyPC and pcAnywhere; 1997-2004; pp. 9; Citrix Online; Citrix Systems, Inc.

GoToMyPC: A Comparison of GoToMyPC and VPNs; 1997-2004; pp. 4; Citrix Online; Citrix Systems, Inc.

* cited by examiner

METHOD AND SYSTEM FOR EXTENDING A COMMUNICATION PORT VIA A GENERAL PURPOSE NETWORK

BACKGROUND OF THE INVENTION

1. Field of the Invention

The present invention relates generally to techniques for data communication, and more specifically to a method and system for extending a communication port over a general purpose network that may include a firewall.

2. Description of the Prior Art

Many devices have imbedded computers or processors that can communicate with a software application running on a personal computer (PC). Examples of such devices include climate control systems, appliances, vending machines, alarm systems, and other similar systems that can have their operation configured or monitored through a data communication connection with a personal computer (PC). The data communication connection typically uses a short range communication link, which may use a cable connected from a communication port on the PC to a compatible communication port on the device.

A common communication port or interface used for communicating with devices is an Electronic Industries Alliance (EIA) standard RS-232 port, which provides a means for establishing a serial communication link using a cable. Serial cable communication links are common because they are simple and inexpensive. However, other types of communications ports may be used in special situations. For example, when increased data transfer speed is needed, a parallel communication port may be selected. Examples of parallel communication ports include the American National Standards Institute (ANSI) small computer system interface (SCSI) port and the Centronics industry standard parallel protocol interface commonly referred to as the parallel printer port. In situations where it is difficult to run wires, a radio frequency or infrared communications port may be used. When electrical interference on a communication cable is likely, an optical communications port may be used.

The communication links used to communicate with the devices frequently requires the PC to be close to the equipment, such as when a service person travels to the device to make a service call. To reduce the need to take a PC to the device, it is desirable to communicate with the device over long distances as if the PC and device were close enough to connect with a cable. This would allow a single worker at home or at a remote location to configure devices that once required long business trips, or required a team of workers providing local configuration for each device.

There are several methods of providing serial communications over long distances. For example, modems have provided connectivity for many years. However, a modem connection requires a dedicated phone line run to the device, and a modem at both ends of the connection. Modems also require a significant amount of time to dial and establish the connection. A modem typically handles only one connection at a time.

With the Internet bringing global connectivity to computers and devices everywhere, it is possible to connect a device's serial port to the Internet and access it from anywhere in the world. U.S. Pat. No. 6,047,319 to Olson describes a method for extending a communications interface from a client PC to a remote device using a computer network, such as the Internet. Olson solves the problem of extending a communications interface from a client to a device when the device's network address is visible or available to the client on a computer network. However, if the device is located behind a firewall that blocks or otherwise prevents attempts to establish a connection, the device will not be visible to the client and the system will fail.

A firewall is a common networking tool used to isolate and protect smaller sub-networks from malicious users or programs on a larger, connected computer network. A network administrator can configure a firewall to allow only certain types of connections to occur through the firewall. In one firewall configuration, no device outside the firewall can initiate a connection with a device inside the firewall. However, the firewall may let devices inside the firewall initiate connections with devices outside the firewall. Once a connection has been initiated, the two devices can communicate bi-directionally. An example of a connection would be a web browser on a PC inside a firewall that requests a web page from a known web server on the Internet outside the local firewall protected network. The web server can only send the web page back to is the PC's web browser if it is using the connecting that the web browser first established.

In another firewall configuration, devices inside the firewall are not allowed to initiate a connection to devices outside the firewall. Instead, a local proxy server inside the firewall is granted special privileges by the firewall and is used to connect to devices outside the firewall. Devices inside the firewall can ask the proxy server to connect to devices on their behalf. Furthermore, a proxy server is usually set up to allow only requests that use the HTTP protocol (the protocol used by web browsers and web servers) to access the outside network.

A possible solution for connecting to devices behind a firewall is to modify the firewall so that it does not block outside connection requests aimed at a specific IP address or a specified port on the firewall. However, this requires the network administrator to loosen the network security settings, effectively creating a hole or a point of vulnerability in the wall. This problem grows larger as the number of devices requiring a special hole in the firewall increases. The situation can become politically difficult if the owner of the device is not affiliated with the owner of the network to which the device is connected.

U.S. Pat. No. 6,601,086 to Howard et al. describes a system for communicating with embedded devices over a network using a centralized server. The embedded devices can be connected to the central server via the Internet. Client applications can access the central server from anywhere on the Internet and ask the server to perform a task involving an embedded device on behalf of the client. This task can be sending data to an embedded device or retrieving data from an embedded device. The advantage of the Howard invention is that the client and embedded device do not need to be able to see each other on the Internet and can therefore be located behind firewalls. However, Howard does not extend a communications interface from the client PC to the device. The interface with the device is between an application on the central server and the device, and the client merely controls an application on the central server.

Therefore, it should be apparent that a need exists for an improved method and system that extends the communication of a port on a computer so that an application on the computer for communicating with equipment can communicate with remotely located equipment via a general purpose network, wherein the equipment may be protected by a firewall.

SUMMARY OF THE INVENTION

A system for extending the operation of a local communications port of a client computer includes a central server, a client communication module, and a remote communication device, each connected to a communication network. A method of operating a central server in a communications network begins with establishing a first communication link between the central server and a remote communication device in response to a request from the remote communication device. A second communication link is established between the central server and a client communication module in response to a request from the client communication module. Application data is received from the client communication module via the second communication link and forwarded, via the first communication link, to the remote communication device. Remote equipment data is received from the remote communication device via the first communication link and forwarded, via the second communication link, to the client communication module.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which.

DESCRIPTION OF THE PREFERRED EMBODIMENTS

Figure 1:
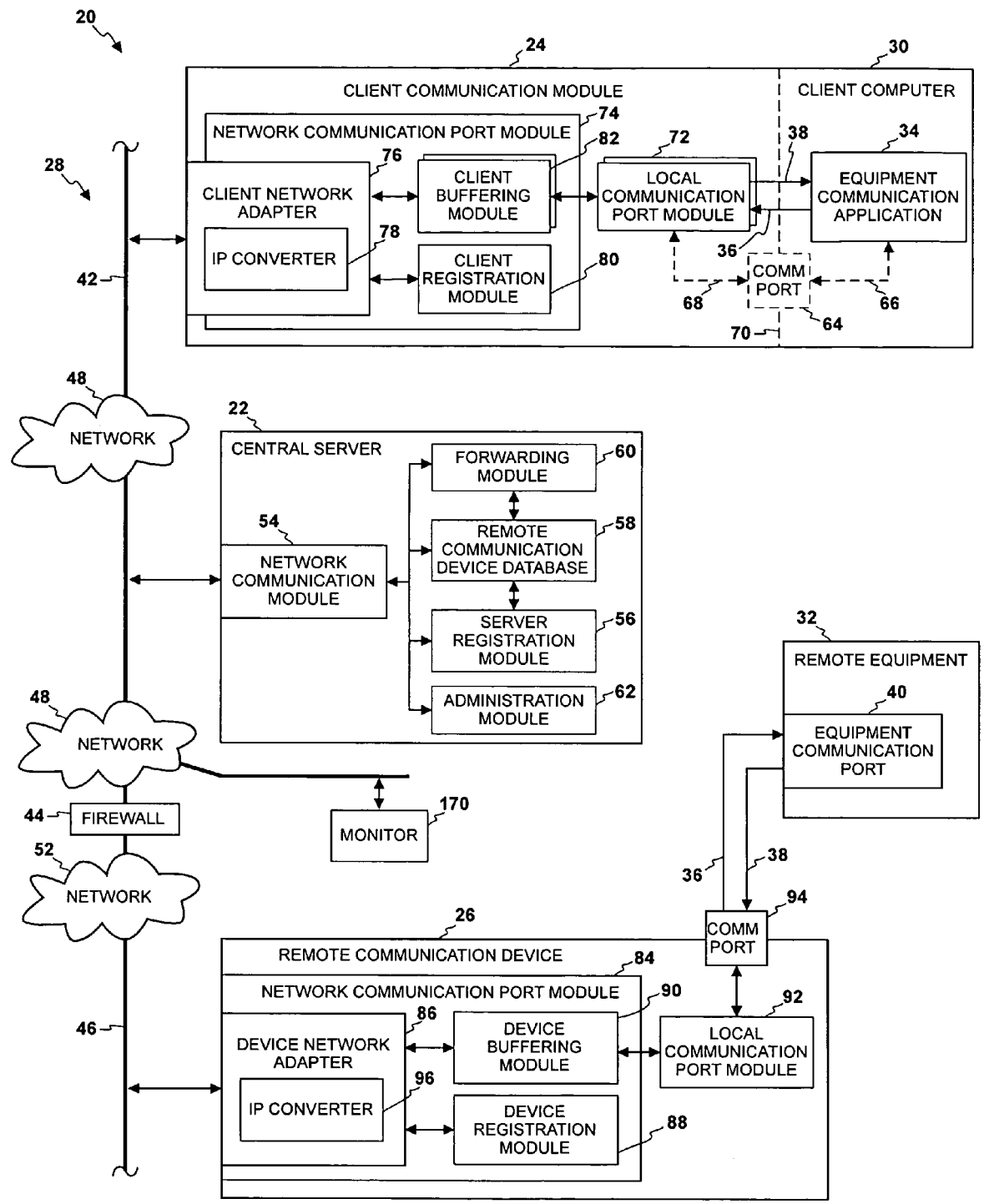
FIG. 1 is an overall high-level block diagram of the system for extending the operation of a local communications port of a client computer in accordance with the present invention.

With reference now to the drawings, and in particular with reference to FIG. 1, there is depicted a high-level system overview of a system for extending the operation of a local communications port of a client computer according to the present invention. As illustrated, communications system 20 includes three major components: a central server 22, a client communication module 24, and a remote communication device 26. These three components are connected to communications network 28.

The purpose of communications system 20 is to provide an extended or long distance communication link or communication service between client computer 30 and remote equipment 32, where remote equipment 32 has an embedded computer or processor that supports communication with an application running on computer 30. Client computer 30 and remote equipment 32 may ordinarily communicate data via a cable or other similar short distance communication link for the purpose of configuring, maintaining, trouble shooting, gathering data, or other similar purpose. Client computer 30 includes equipment communication application 34, which is a software application that runs in computer 30 for configuring, maintaining, or administering the operation of remote equipment 32. Equipment communication application 34 is typically programmed to communicate with remote equipment 32 via an industry standard or proprietary communication protocol communicated over a standard communication port that is typically included as a part of client computer 30. Alternatively, equipment communication application 34 may be a terminal emulator program that sends and receives text to communicate with remote equipment 32. An example of such a standard communication port is a serial communication port that operates in accordance with the Electric Industry Association standard RS-232, which is an electrical and mechanical standard for a relatively short distance serial communication link. In other embodiments of the present invention, alternative communication ports may be used or extended, such as, for example, a USB port, an Ethernet port, or the like.

In this document, communication data output to a standard communication port by equipment communication application 34 is referred to as application data 36, and communication data output by remote equipment 32 is referred to as remote equipment data 38. Thus, equipment communication application 34 receives remote equipment data 38 and outputs or sends application data 36, while equipment communication port 40 in remote equipment 32 receives application data 36 and sends remote equipment data 38. If client computer 30 and remote equipment 32 are in relatively close proximity, they may be connected via a communications cable. However, using communications system 20 client computer 30 and remote equipment 32 may be in any two locations served by communication network 28.

It is important to note that application data 36 and remote equipment data 38 may include all data and signals of a communication port, which can be used to carry many types of information when a cable is connected between client computer 30 and remote equipment 32. For example, in addition to transferring communication data over data lines, a communication port usually includes signal lines intended for controlling the communication interface. The data lines, which carry the bulk of the data, represent "in-band" signals, and the other signal lines carry information referred to as "out-of-band" signals. In an RS-232 communication port, the Transmit Data (TX) and Receive Data (RX) pins carry the in-band signals. The Request to Send (RTS), Clear to Send (CTS), Data Set Ready (DSR), Data Terminal Ready (DTR), Ring Indicator (RI), and Carrier Detect (CD) carry the out-of-band signals. The out-of-band signals are typically used for flow control, but they can also be used for communicating useful information. As an example, a timer device could be started and stopped based on the state of the DTR signal. Thus it may be important that the communication link transmit the state of the out-of-band signals included in application data 36 and remote equipment data 38.

In a preferred embodiment, communication network 28 is implemented with an Internet Protocol (IP) based network, such as the Internet. As shown in FIG. 1, communication network 28 may include local area networks 42 and 46, which are connected by Internet 48. Local area network 46 may be connected to a larger corporate network 52 that is protected from Internet 48 by firewall 44. Client communication module 24 may also be protected behind a firewall (which is not shown in FIG. 1) from Internet 48. Central server 22, however, is not hidden behind a firewall with respect to client communication module 24 and remote communication device 26. Note that central server 22 may be protected in some aspects by a firewall, but client communication module 24 and remote communication device 26 are free to contact and login to establish communications links with central server 22.

Central server 22 includes network communication module 54, which formats and communicates data via communication network 28. In a preferred embodiment, communication data is transmitted and received in packets in accordance with the TCP/IP Internet standards. Network communication module 54 includes hardware and software necessary to send and receive data packets, which may include, for example, the hardware and software to implement the physical, network, and transport layers in the Open Systems Interconnection (OSI) reference model developed by the International Organization for Standardization (ISO).

Central server 22 also includes server registration module 56, which handles the tasks of receiving requests for establishing a communications link from both remote communication device 26 and client communication module 24. In response to such received requests, server registration module 56 may establish and authenticate the communications link to confirm the identity of remote communication device 26 and client communication module 24. The identity of central server 22 may also be authenticated to remote communication device 26 and client communication module 24 using any one of several know methods of authentication. Communication between central server 22 and both client communication module 24 and remote communication device 26 also may be encrypted using conventional encryption techniques. If encryption is used, the encryption scheme is preferably negotiated and initiated before passwords are passed for logging into central server 22.

According to an important aspect of the present invention, central server 22 does not initiate a communication session or the establishment of a communications link with either client communication module 24 or remote communication device 26. This is because client communication module 24 and remote communication device 26 are frequently located behind a firewall, such as firewall 44 on network 28. And such firewalls are frequently set to block attempts to initiate a communication link by an outside device, like central server 22. This may be referred to as blocking an inbound communication session.

However, those same firewalls are often set to permit attempts to establish a communication link by a device on the inside of the firewall, such as client communication module 24 or remote communication device 26, which is on the inside or protected side of firewall 44. Because devices behind the firewall initiate an outbound communication with central server 22 having a known and open address on the Internet, communication links with client communication module 24 and remote communication device 26 are usually permitted.

If firewall 44 is set to restrict certain protocols or the use of less frequently used port numbers, the communication between central server 22 and remote communication device 26 and client communication module 24 may use the Hypertext Transfer Protocol (HTTP) on the conventionally used port 80, which is a protocol and port that most firewalls do not restrict.

HTTP is also compatible with most proxy servers. Proxy servers are used when a computer behind a firewall is not allowed to make any outbound connections at all. Instead, a local proxy server inside the firewall is granted special privileges by the firewall and is used to make connections outside the firewall. Computers inside the firewall can ask the proxy server to connect to computers outside of the firewall on their behalf. Typically, proxy servers will change the headers within HTTP, but leave the main message payload intact. In addition to supporting HTTP, some proxy servers allow other types of protocols such as S-HTTP, FTP, and SOCKS. In order to use a proxy server, the computer must become aware of the proxy server either through manual configuration or through an automatic method such as Web Proxy Auto Discovery (WPAD). Remote communication device 26 and client communication module 24 may use a proxy server to establish and maintain communication with central server 22.

Central server 22 also includes database 58 for managing a list of connected remote communication devices 26. Once client communication module 24 has been registered in central server 22, central server 22 may grant access to data stored in remote communication device database 58 so that client communication module 24 can select a registered remote communications device 26 in order to set up a communications link with a selected remote equipment 32.

Remote communication device database 58 may generally include subchannel data and administrative data. Subchannel data may include information to support particular communication links in the system, such as information recording the network address of remote communication device 26, details regarding the type of remote equipment 32 connected to the registered remote communication device 26, and other similar details that may be needed by client communication module 24 for establishing or managing a communication link with remote communication device 26. Administrative data may pertain more to the overall system, and may include lists of who or what devices are logged in, what permissions a particular user (i.e. operator of client communication module 24) has to communicate with particular remote communication devices 26.

Central server 22 also includes forwarding module 60, which is used for forwarding datagrams from client communication module 24 to a selected remote communication device 26, and for forwarding datagrams from remote communication device 26 to the appropriate client communication module 24. Thus, forwarding module 60 forwards packets containing application data 36 to remote equipment 32, and forwards packets containing remote equipment data 38 to client computer 30. Together, forwarding module 60 and remote communication device database 58 perform a function similar to a router; forwarding module 60 does not interpret, translate, or change the payload data that is forwarded. In order to perform its function, forwarding module 60 does not need any particular working knowledge of either remote equipment 32 or equipment communication application 34. The forwarding is preferably done in "real time."

Central server 22 may include administration module 62, which may be used to update software or various operating parameters within client communication module 24 and remote communication device 26 in order to manage a communication load or otherwise change or update the operation of communication system 20. For example, instructions or data contained in administration module 62 may instruct remote communication device 26 to log into or establish future communication links with a different one of multiple central servers 22 in order to distribute the communication load among the several central servers 22. Data in administration module 62 may also change the way client communication module 24 and remote communication device 26 establish a communication link and proceed through the authentication process. For example, passwords may be changed, or encryption schemes may be implemented or updated.

Other functions performed by administration module 62 may include adding users to the system, managing permissions of the users, grouping devices in a hierarchical listing or tree structure so that users can efficiently locate and manage many remote communication devices 26.

Client communication module 24 may be implemented as a separate hardware module or device connected to client computer 30 via a communication cable or communication link, or, alternatively, client communication module 24 may be implemented in software within client computer 30, which software emulates hardware and interfaces with existing hardware or peripheral devices of client computer 30. If client communication module 24 is a hardware device separate from client computer 30, client computer 30 communicates with client communication module 24 through hardware, software, and communication cables or a wireless communication link, which is schematically represented in FIG. 1 by communication port 64 and communication paths 66 and 68. Dashed line 70 represents such a separation of hardware between client computer 30 and client communication module 24 when client communication module 24 is implemented in a separate hardware device.

In a preferred embodiment, communication port 64 is a serial communications port, such as an RS-232 port. In alternative embodiments, communication port 64 may be an Ethernet port, a USB port, an infrared port, a Bluetooth radiofrequency communication port, a fiber-optic port, or another similar standard communication port frequently used with personal computers.

When client communication module 24 is implemented or emulated in software, local communication port module 72 may be a virtual communication port that appears to equipment communication application 34 as an interface to a hardware communication port, such as a serial port. When local communications port module 72 is implemented in software as a virtual port, the software emulates the interface of a typical communications port so that equipment communication application 34 does not need to be modified to send and receive data to and from local communication port module 72. Note that when a virtual port is used, client computer 30 need not have a hardware equivalent of the emulated port.

Whether implemented as a virtual port in software, or an actual hardware and software port in a stand alone device, local communication port module 72 uses data flow control, which controls transmissions between communications devices to make sure the sender does not send data until the receiver is ready to receive it. Flow control may be achieved by means of hardware or software. In some serial data transmission protocols, an Xon/Xoff software handshaking protocol can be used. Some serial ports use CTS/RTS (clear to send/ready to send) signals or DTR/DSR (data terminal ready/data set ready) signals on dedicated hardware pins of the connector to control data flow. In a preferred embodiment of the present invention, the method of flow control between equipment communication application 34 and local communication port module 72 is the same as what would be used if communicating over a cable with remote equipment 32.

Additionally, the use of flow control and the type of flow control used by equipment communication application 34 and client computer 30—such as in-band signaling protocols, out-of-band signaling protocols, or no flow control at all—is preferably communicated to local communication port module 72 so that there is an understanding between the two as to what signals constitute local flow control. This understanding allows the signals not being used as flow control to be used for something else, such as a proprietary signaling or control. Once the flow control setup is communicated to communication port module 72—whether through configuring a virtual port, or through special escape or command sequences, or through setting dip switches on client communication module 24—such setup information is also communicated to local communication port module 92 in remote communication device 26 so that flow control at the local level between remote equipment 32 and remote communication device 26 may also control data flow and properly interpret alternate uses for signals carried by, for example, un-used flow control facilities. This setup information may be communicated through sending opcodes, as discussed below.

As an example, if Xon/Xoff in-band signals are selected for local flow control, the CTS/RTS or DTR/DSR signals in an RS-232 port may be available for communicating other information between equipment communication application 34 and remote equipment 32 and will not be confused or misinterpreted at the local interface for flow control signals. With this understanding about local flow control, overflow conditions can be locally controlled and "non-conventional" uses of other signals not being used for flow control may be transmitted over the link and reproduced at the remote end of the link between client computer 30 and remote equipment 32.

Local communication port module 72 is coupled to network communication port module 74, which buffers, frames, and formats data for transmission and reception with communication network 28. Network communication port module 74 includes client network adaptor 76, which includes hardware and software for transmitting and receiving data packets via local area network 42. Client network adaptor 76 is preferably an Ethernet network adaptor for communicating using TCP/IP networking standards. Client network adaptor 76 includes Internet protocol converter 78, which produces transmission packets having the proper headers and data fields required by the particular packet transmission standard for local area network 42. In alternative embodiments, client network adapter 76 and Internet protocol converter 78 may be implemented for another packet transmission protocol, such as, for example hardware and converters to produce packets for: wireless transmission using the Institute of Electrical and Electronics Engineers (IEEE) standard 802.11a, 802.11b, or 802.11g; the General Packet Radio Service (GPRS) standard for Global System for Mobile Communications (GSM); the Cellular Digital Packet Data (CDPD) standard for mobile phones; or the like.

Network communication port module 74 also includes client registration module 80, which initiates the establishment of a communications link between client communication module 24 and central server 22. Client registration module 80 may also include hardware and software for authenticating the identity of client communication module 24. Data encryption hardware and software may also be included in network communication module 74.

Network communication port module 74 uses client buffering module 82 to buffer data, frame data packets, and control the flow of data between local communication port module 72 and remote communication device 26. The buffering modules of the present invention are described more completely with reference to FIG. 2, below.

Similar to client communication module 24, remote communication device 26 also includes network communication port module 84. Network communication port module 84 includes device network adaptor 86, device registration module 88, and device buffering module 90. Device network adaptor 86 is similar to client network adaptor 76 in that it formats and communicates data via local area network 46 and communication network 28 using TCP/IP networking standards. Internet protocol converter 96 is used to manage the headers and other data fields required by the packet transmission protocol for local area network 46.

Device registration module 88 is used to initiate and establish a network communication link between remote communication device 26 and central server 22. If the communication link needs to be authenticated, device registration module 88 will execute the steps to authenticate the identity of remote communication device 26 so that its availability is recognized and recorded in remote communication device database 58.

Remote communication device 26 also includes local communication port module 92 coupled to device buffering module 90. Local communication port module 92 is similar to local communication port module 72 in client communication module 24, wherein it includes software and hardware necessary to format the transmission of application data 36 and the reception of remote equipment data 38 in communicating data with remote equipment 32.

Local communication port module 92 is coupled to communications port 94, which provides an electrical and mechanical interface for communicating with equipment communication port 40 on remote equipment 32. Communication port 94 is preferably a serial communications port, such as an RS-232 port. In alternative embodiments, communications port 94 may be implemented with any standard short range communications port, such as those listed above with respect to communications port 64. Preferably, communications port 94 and communications port 64 use the same communication standard, which typically means that equipment communication application 34 operates as it was originally designed and it does not need modification to compensate for a different communications standard.

Device registration module 88 performs a function similar to that of client registration module 80 in client communication module 24. Device registration module 88 includes software and hardware necessary for initiating and establishing a communication link between remote communication device 26 and central server 22. Device registration module 88 may also include the necessary hardware and software to perform an authentication process to more securely identify the identity of remote communication device 26. Network communication port module 84 may also include hardware and software for encrypting messages communicated via communication network 28.

Device buffering module 90 performs a function similar to that of client buffering module 82 in client communication module 24. The process of communicating and buffering data between client communication module 24 and remote communication device 26 is more clearly illustrated in FIGS. 2 and 4 and the related discussion below.

Figure 2:
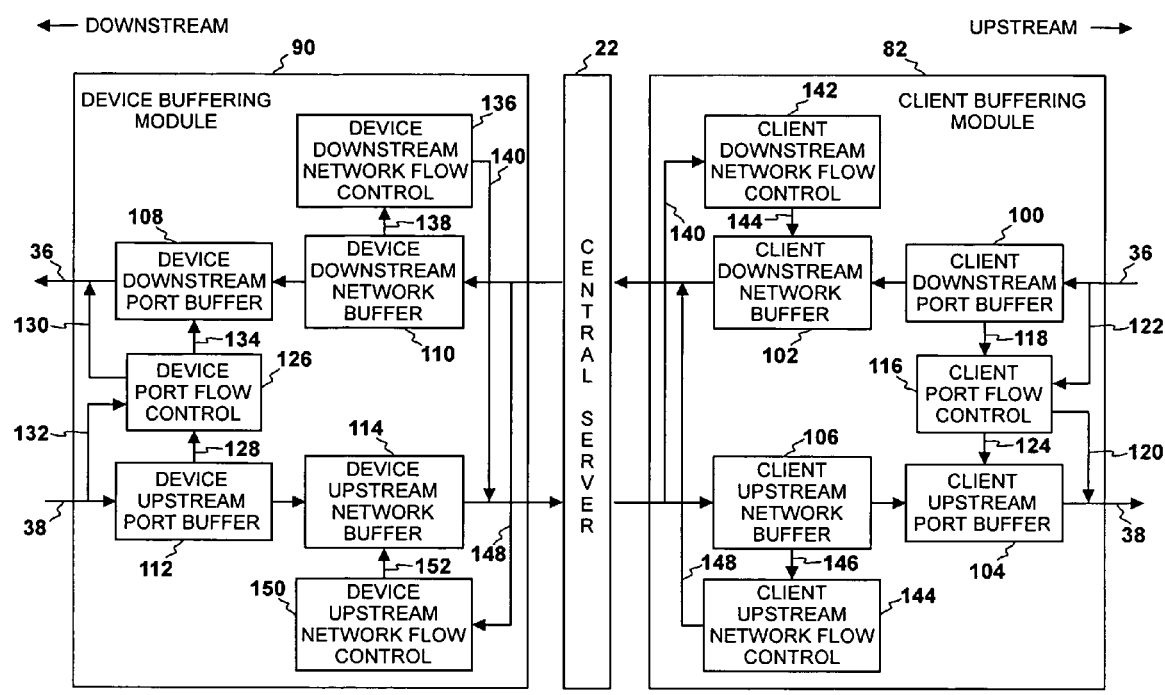
FIG. 2 is a more detailed block diagram of data buffers and flow control modules used in the system shown in FIG. 1.

With reference now to FIG. 2, there is depicted in greater detail the relationship between device buffering module 90 and client buffering module 82 through central server 22. As used herein, the term downstream refers to a direction of data flow from client computer 30 to remote equipment 32. And upstream refers to the direction of data flow from remote equipment 32 to client computer 30. Thus, application data 36 flows in a downstream direction, while remote equipment data 38 flows in an upstream direction. Application data 36 enters client buffering module 82 on the right side of FIG. 2 and is output by device buffering module 90 on the left side. Similarly, remote equipment data 38 enters on the left side of FIG. 2 and is output on the right side. Note that the control of upstream data flow and downstream data flow are very similar, and the operation of client buffering module 82 is similar to the operation of device buffering module 90.

Application data 36 enters client buffering module 82 and is temporarily stored in client downstream port buffer 100. Buffer 100 temporarily stores a stream of application data before it is grouped into packets for transmission on network 28 (See FIG. 1).

Client downstream port buffer 100 is coupled to client downstream network buffer 102, where data may be held in packets, or as data allocated to a particular packet. Thus, port buffer 100 and network buffer 102 work together wherein port buffer 100 handles a stream of data and network buffer 102 handles packets of data. Note that this structure of a data stream buffer coupled to a packet buffer occurs in FIG. 2 on the transmit side and the receive side of client buffering module 82, and on the transmit and receive side of device buffering module 90. More specifically, the stream buffer and packet buffer pairs exist on the downstream side of the client buffering module 82 at client downstream port buffer 100 and client downstream network buffer 102, and on the upstream side of client buffering module 82 at client upstream port buffer 104 and client upstream network buffer 106. Similar buffer pairs are shown in device buffering module 90 at device downstream port buffer 108 and device downstream network buffer 110 and at device upstream port buffer 112 and device upstream network buffer 114.

In an operation that groups data in client downstream port buffer 100 into packets buffered in client downstream network buffer 102, data in buffer 100 is polled, at a rate appropriate for the expected data rate and latency requirements, and the data in buffer 100 is selected as a packet payload if it does not exceed a maximum number of bytes, such as 1,400 bytes. Data selected for a packet may have a zero byte length. A preferred polling rate is from 10 to 100 times per second.

Figure 5:
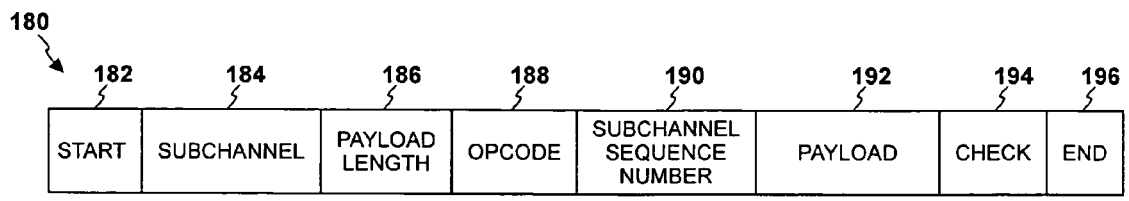
FIG. 5 illustrates the formatting of a preferred message packet used in the system for extending the operation of a local communications port of a client computer in accordance with the present invention.

In a preferred embodiment, message packets transferred between client communication module 24 and remote communication device 26, through central server 22, are formatted, and contain the fields, depicted in FIG. 5. As shown, message frame 180 contains start byte field 182, subchannel field 184, payload length field 186, opcode field 188, subchannel sequence number field 190, payload field 192, check field 194, and end field 196.

All messages start with start byte field 182 containing a distinguishable start character, such as the STX character. Subchannel field 184 identifies the subchannel of communication between a particular client communication module 24 and central server 22, and a subchannel between central server 22 and remote communication device 26. Subchannels are specified in client computer 30 by a particular "COM" port, if an RS-232 interface is used, or another appropriate port identifier.

Payload length field 186 includes a value indicating the number of bytes in payload field 192. The maximum length of the payload is preferably 1,400 bytes.

Opcode field 188 contains an indicator of what operation should performed upon receipt of the packet, or what operation should be performed with data in payload field 192. Opcodes may be used to define operation parameters at comm ports 64 and 94 (See FIG. 1), such as setting baud rates, setting outputs on particular pins of the communication port connector, and the like. Opcodes in field 188 may also be used for implementing data flow control, such as the network level flow control described above. Opcodes in field 188 may also indicate a request to login for the establishment of a communication link, and also to request connections with particular remote communication devices 26. One opcode is used to indicate that the contents of payload field 192 is communication data that should be forwarded over a particular subchannel.

Subchannel sequence number field 190 is a sequential number incremented for each message sent on a given subchannel. Sequence numbers shall be unique for all end-to-end messages between a particular client communication module 24 and remote communication device 26, but not considering all system-wide messages between client communication module 24 and central server 22 and remote communication device 26 and central server 22. The sequence numbers for messages in subchannel sequence number field 190 will eventually repeat because only a finite number of values can be represented in the field. Reuse of sequence numbers should occur infrequently so that two messages with the same sequence number and subchannel number are not confused in the system.

Payload field 192 includes data needed to carry out the operation specified by the opcode in opcode field 188. Once communication is established between a client communication module 24 and a remote communication device 26, this field typically includes data to be forwarded between the two devices. The length of payload field 192 is allowed to be zero. Thus, if data is not ready to be forwarded between client computer 30 and remote equipment 32, communication system 20 may periodically send a zero length payload packet.

Check field 194 includes data that can be used by the receiver to check the integrity of the received packet. For low-noise channels and short messages, this is preferably a sixteen-byte additive byte-wise checksum of all proceeding bytes in the message not including start byte field 182.

End field 196 contains a byte that denotes the end of the packet or message.

To make the protocol more robust, the format of the fields, with the possible exception of payload field 192 and check field 194, can be selected such that they do not include the character used for the start byte 182 or stop byte 196. Furthermore, the payload data and/or checksum may be specially encoded such that any start or stop characters would not be communicated in their raw form over the link.

With reference again to FIG. 2, client downstream port buffer 100 and client upstream port buffer 104 are monitored and controlled by client port flow control 116. When application data 36 fills client downstream port buffer 100 to a point that exceeds a threshold, client port flow control 116 is notified through signal 118. In response to signal 118, client port flow control 116 sends signal 120 to client computer 30 (See FIG. 1) so that transmission of application data 36 will be suspended temporarily as client downstream port buffer 100 passes data to client downstream network buffer 102.

Likewise, when client port flow control 116 receives signal 122 indicating that a buffer in client computer 30 is full, client port flow control 116 instructs client upstream port buffer 104 to temporarily suspend transmitting remote equipment data 38 via signal 124.

The buffering of a serial data stream in device buffering module 90 operates in a similar manner. For example, device port flow control 126 uses signal 128 to indicate that device upstream port buffer 112 is filled to a point that exceeds a threshold. In response to signal 128, device port flow control 126 sends signal 130 to equipment communication port 40 (See FIG. 1) in order to temporarily suspend the transmission of remote equipment data 38 into device upstream buffer 112. For the downstream side, device port flow control 126 receives signal 132 when a buffer in equipment communication port 40 is full beyond a threshold, and in response uses signal 134 to temporarily suspend transmission of application data 36 from device downstream port buffer 108.

Note that signals 122, 120, 130 and 132 may be data symbols embedded within a serial data stream, or they may be hardware signals that change a voltage on a pin of a connector. An example of data symbols is the use of Xon and Xoff commands. Hardware signals may be implemented similar to RTS and CTS signals in the common implementation of the RS-232 interface.

With regard to network packet buffering over communication network 28, client buffering module 82 uses client downstream network buffer 102 to temporarily hold datagrams or packets that will be sent downstream via central server 22. Client downstream network buffer 102 does not send a next packet until a corresponding buffer, device downstream network buffer 110, has enough storage space to receive a maximal length packet. Device downstream network flow control 136 uses signal 138 to determine whether or not device downstream network buffer 110 can receive a maximal length packet. If a maximal length packet can be received, device downstream network flow control 136 sends signal 140 upstream to client downstream network flow control 142, which in turn sends signal 144 to client downstream network buffer 102 instructing the transmission of the next packet.

In a similar manner, if client upstream network flow control 144 determines through signals 146 that client upstream buffer network 106 does not have enough storage space to receive a maximal length packet, then client upstream network flow control 144 sends signal 148 to device upstream network flow control 150. In response to signal 148, device upstream network flow control 150 uses signal 152 to instruct device upstream network buffer 114 to temporarily suspend the transmission of the next network packet.

Signals for controlling the flow of packets over network 28 such as signals 140 and 148, may be embedded or encoded within data packets sent over communication network 28. For example, an opcode in field 188 (See FIG. 5) may indicate that information in payload field 192 contains flow control information. In a preferred embodiment, central server 22 does not participate in the flow control, and merely forwards the flow control information or signals.

In a preferred embodiment, the determination of whether or not a receiving buffer has enough space to store a maximal length packet is implemented by limiting the number of unacknowledged transmitted packets in the channel, where a transmitted packet is acknowledged when it is sent out of the buffer that received the packets, such as when sent from device downstream network buffer 110 to device downstream port buffer 108. In one embodiment, client downstream network buffer 102 stops sending packets when it is determined that there are three unacknowledged packets in the channel, or stored in device downstream network buffer 110. When packets are moved from device downstream network buffer 110 an acknowledgement for the particular packet is sent from device downstream network flow control 136 to client downstream network flow control 142, which reduces the number of unacknowledged packets in the channel.

It should be apparent to those persons skilled in the art that three levels of data flow control are used in the present invention. One level of flow control may be referred to as "end-to-end" flow control, which is the normal flow control that may take place between client computer 30 and remote equipment 32 if these two devices were connected via a cable or other short range serial communication link. In the end-to-end flow control, client computer 30 or equipment communication application 34 is instructing remote equipment 32 or equipment communication port 40 to stop transmitting data. These end-to-end flow control messages are sent in the data stream for Xon/Xoff type commands, or are duplicated in hardware signals at the communication port interfaces, 64 and 94 on either end to implement RTS/CTS-type hardware signals.

Another level of flow control is the local "communication port flow control," which is implemented independently on either end by client port flow control 116 and device port flow control 126 (See FIG. 2). This communication port flow control is controlled by thresholds in client downstream port buffer 100 and device upstream port buffer 112, and in the corresponding buffers in client computer 30 and remote equipment 32. These flow controls operate independently of one another in a local sense between client computer 30 and client communication module 24, and between remote equipment 32 and remote communication device 26.

The third level of data flow control is a "network level" flow control. This network level controls the flow of data packets between client communication module 24 and remote communication device 26 via central server 22. The network level flow control does not allow the transmission of the next network packet unless there is room in a receiving buffer for a maximal length data packet. This network level flow control is depicted and discussed in more detail with reference to FIG. 4.

Figure 3:
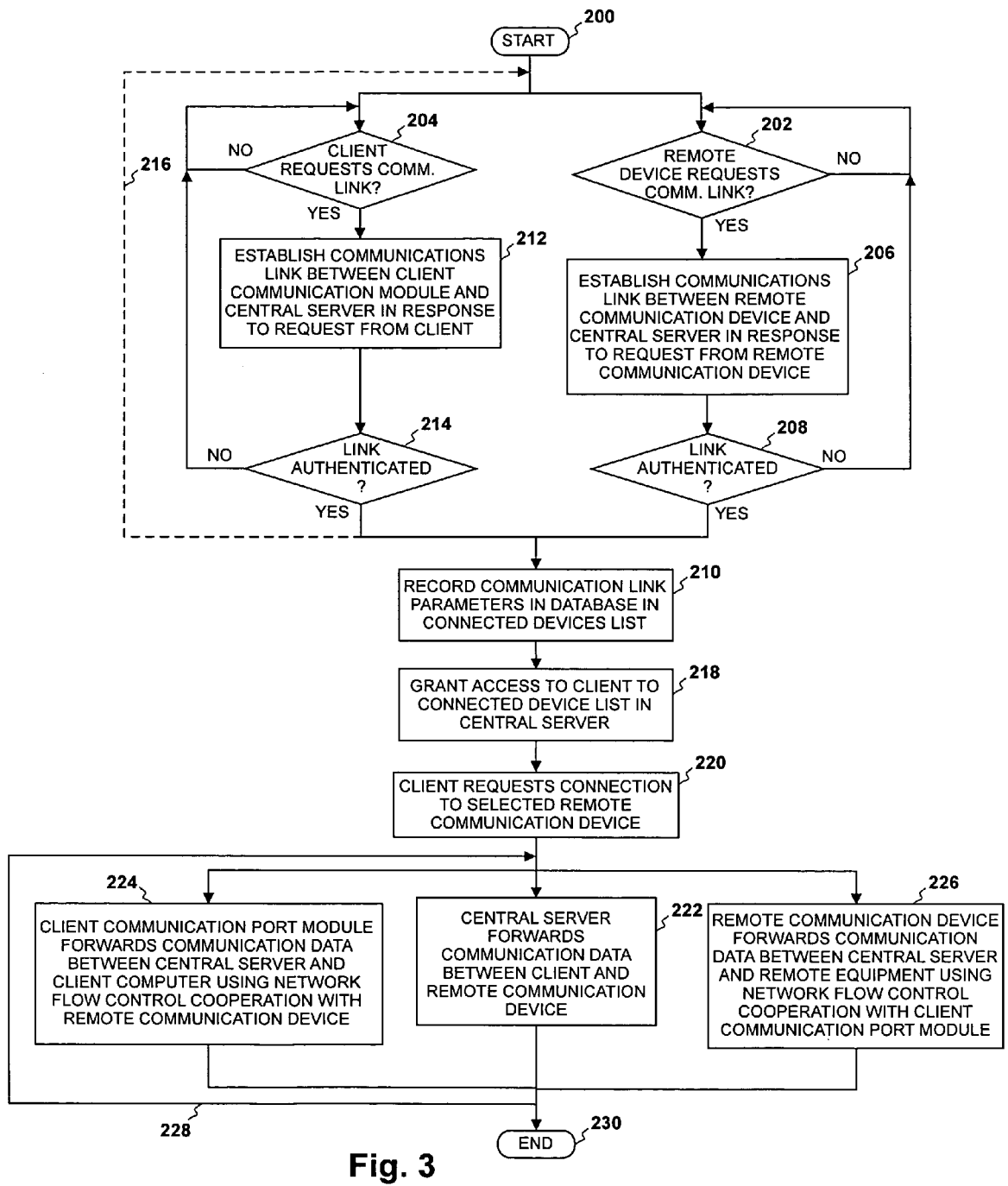
FIG. 3 is a high-level logical flowchart of the operation for extending a local communications port of a client computer in accordance with the method and system of the present invention.

Turning now to FIG. 3 and the operation of communication system 20, the process of extending a communication link begins at block 200, and thereafter passes to blocks 202 and 204 wherein the process waits for both a remote communication device 26 to request a communication link with central server 22, and for a client communication module 24 to request a communication link with central server 22 (See FIG. 1). When the system is powered up or initialized, device registration module 88 in remote communication device 26 initiates an attempt to contact central server 22 to request the establishment of a communication link via communication network 28. Similarly, client registration module 80 in client communication module 24 also initiates the establishment of a communications link between client communication module 24 and central server 22 via communication network 28.

Note that remote communication device 26 may establish a communications link at any time, independent of the establishment of any other communication link, including the communication link between client communication module 24 and central server 22. In the flowchart of FIG. 3, the path on the right side beginning at block 202 depicts establishing a communication link between a remote communication device 26 and a central server 22, while the left side flow beginning at block 204 depicts the establishment of a communication link between client communication module 24 and central server 22.

Once a request for a communications link has been made, the communications link is established between remote communication device 26 and central server 22 in response to the request from the remote communication device, as illustrated at block 206. In a preferred embodiment, authentication of the communications link is required. This process of authentication verifies the identity of remote communication device 26. The authentication process may also verify that the user of communication system 20 is entitled to use the service by the payment of a fee or other contractual arrangements with the service provider or the operator of central server 22. If the link is not authenticated, the process follows the "no" branch from block 208 and returns to block 202 to wait for another request for a communications link. If the communication link is authenticated, the process passes to block 210.

Returning again to block 204, if a communications link has been requested by client communication module 24, the process passes to block 212, wherein the communications link between client communication module 24 and central server 22 is established in response to the request from a client. In a preferred embodiment, the process determines whether or not the communications link has been authenticated, as depicted at block 214. If the communications link cannot be authenticated, the process passes back to block 204 to wait for another request to establish a communications link. Once the communication link with client communication module 24 has been authenticated, the process passes to block 210.

As depicted by dashed line 216, the process within central server 22 may interactively return to the top of the flowchart to wait for additional requests for establishing communication links between additional client communication modules 24 and remote communication devices 26. Thus, communications system 20 illustrated in FIG. 1 may have several client communication modules 24 connected to central server 22, and may have several remote communication devices 26 simultaneously connected to central server 22. By supporting many communication links, several users having client communication module 24 may establish a communication link with a selected one of a plurality of remote communication devices 26.

After communication links are established and authenticated, communication link parameters are recorded in a database in a connected device list, as illustrated at block 210. Communication link parameters includes data that identifies and describes the communication link. For example, each communication link may have a subchannel identifier, and each link may have network addresses and other network operating parameters associated with the subchannel, all of which may be recorded in remote communication device database 58 in central server 22.

Once at least one remote communication device 26 and one client communication module 24 have both established communication links with central server 22 via communication network 28, and data has been recorded in the database, the process grants to client communication module 24 access to the connected device list in central server 22, as depicted at block 218. In communications system 20, each client communication module 24 has permission or authority to establish an end-to-end communication link with selected ones of the plurality of remote communication devices 26 that have established communication links with central server 22. Thus, the access granted to client communication module 24 may be based on, or restricted to, records in the list for which client communication module 24 has permission to communicate with. This keeps users of client computer 30 from gaining unauthorized access to remote equipment 32, and thereby gaining unauthorized access to sensitive data or control of the equipment. Note that an "end-to-end communication link" spans the distance of the combination of the communication link between client communication module 24 and central server 22 and the link between central server 22 and remote communication device 26, where the end-to-end communication link supports a communication session between a specific client computer 30 and a specific remote equipment 32.

The connected device list may be stored in remote communication device database 58 (see FIG. 1). The list may contain a remote communication device identifier, a communication link identifier and status to indicate whether or not remote communication device 26 has a currently established communication link with central server 22, data indicating the type of remote equipment 32 connected to remote communication device 26, and other similar status or parametric data that may aid client communication module 24 or the user of client computer 30.

Once client communication module 24 has gained access to the database, the client communication module requests a connection to a selected remote communication device 26, as illustrated in block 220.

Once a valid and authorized request for connection has been made, the process executes steps in client communication module 24, central server 22, and remote communication device 26 as shown by the parallel flow paths to blocks 222, 224, and 226. Block 222 illustrates the process of central server 22 bidirectionally forwarding communication data between client communication module 24 and remote communication device 26. This step may be implemented using forwarding module 60 in central server 22, together with data in remote communication device database 58. As forwarding module 60 receives application data from client communication module 24, forwarding module 60 determines a forwarding address from remote communication device database 58, and forwards or retransmits application data 36 to remote communication device 26 in accordance with the data stored in database 58. Similarly, remote equipment data 38 transmitted to central server 22 is forwarded by forwarding module 60 to an address stored in remote communication device database 58.

As illustrated at block 224, client communication port module 74 in client communication module 24 forwards communication data between central server 22 and client computer 30 using a network flow control process that cooperates with the network flow control in network communication port module 84 in remote communication device 26. This network flow control process is described more completely below, with reference to FIG. 4.

And as depicted in block 226, remote communication device 26 forwards communication data between central server 22 and remote equipment 32 using network flow control that cooperates with network communication port module 74 in client communication module 24.

As illustrated by flowchart arrow 228, the three processes indicated in blocks 222, 224, and 226 continues to forward data between client computer 30 and remote equipment 32, via central server 22, during normal system operation, until the process is terminated, as shown at block 230.

Figure 4:
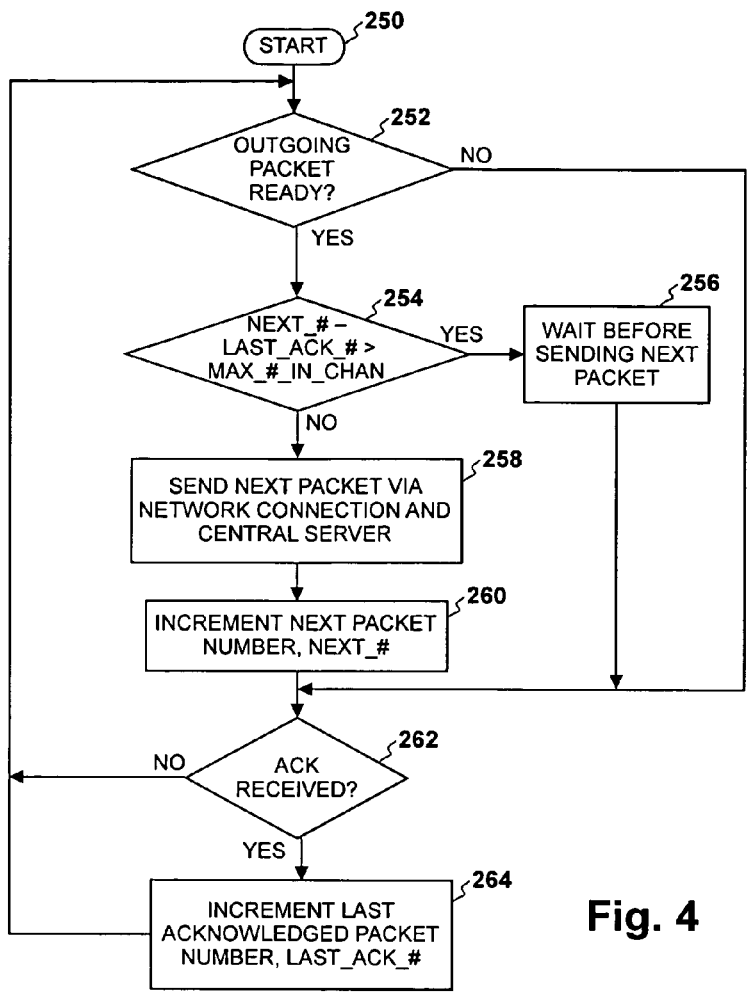
FIG. 4 is a more detailed flowchart of the process of controlling network data flow in accordance with the method and system of the present invention.

With reference now to FIG. 4, there is depicted a high-level flowchart of the process of network-level flow control in accordance with the method and system of the present invention. This process is executed simultaneously in client buffering module 82 and device buffering module 90 to control the transmission of packets between client communication module 24 and remote communication module 26 through central server 22. As illustrated, the is process begins at block 250, and thereafter continues to block 252 wherein the process determines whether an outgoing packet is ready to be transmitted to central server 22 via communication network 28. Such an outgoing packet may be ready to send downstream from client downstream network buffer 102 (See FIG. 2), or upstream from device upstream network buffer 114. In a preferred embodiment, the process uses a polling clock to determine that a next packet is ready to send. In some instances, a zero length data packet is sent. In an alternative embodiment, a threshold number of bytes may be exceeded to trigger the determination that an outgoing packet is ready to send. If an outgoing packet is not ready be sent, the process advances to block 262 as shown by the "no" branch.

If an outgoing packet is ready to be sent, the process determines whether or not a difference between a next packet number and a last packet acknowledgement number is greater than a value for the maximum number of packets in the channel as depicted at block 254. As packets are transmitted, a sequence number is assigned to each packet. As packets are passed out of the packet buffer at the receiving end, the receiving end sends an acknowledgement containing the number of the last packet to leave the receiving buffer. In a preferred embodiment, the buffer size is set to be at least a number of bytes that could be transmitted in three maximal length packets. Therefore, at block 254 the process may determine whether the number of the next packet to be sent minus the number of the last packet acknowledged is greater than three, which is the selected number of packets that may be "in the channel" or stored in the network buffers, such as device network buffer 110 or client upstream network buffer 106 shown in FIG. 2.

If the process determines that the difference between the next packet number and the last packet acknowledged is greater than the selected maximum number of packets in the channel, the process waits before sending the next packet, as illustrated at block 256, and thereafter passes to block 262. If the difference between packet numbers is not greater than the threshold number of packets in the channel, the process sends the next packet via communication network 28 and central server 22, as depicted at block 258. After sending the packet, the next packet number is incremented, as illustrated at block 260.

At block 262, the process determines whether or not a packet acknowledgement has been received at the device containing the transmit buffer. If a packet acknowledgement has not been received, the process returns to block 252 to check for the readiness of a new outgoing packet, as described above. If the process determines that a packet acknowledgement has been received, the process increments the last acknowledged packet number, as depicted at block 264. Thereafter, the process iteratively returns to block 252 to begin the process again.

According to the present invention, the flow control at the network level manages storage space in network buffers and makes decisions to transmit a next packet based upon the availability of space in the network buffer. Network packets are only transmitted if there is space available in the receiving network buffer for a maximal length data packet. A preferred method of managing storage space in buffers is managing the number of packets that are in the channel, which is the number of packets that have not been successfully delivered or output at the destination.

Another feature of the present invention allows a remote user to monitor a communication session between a client communication module 24 and a remote communication device 26. In the prior art, when a communication interface is established between two devices using a cable, it may be useful for a third device to monitor the state of the signals transferred on the interface. The cable can be modified so that one or more of the wires is tapped so that signals are also fed to the monitoring device. The tapping would not interfere with the basic communication interface, but would allow the monitoring device access to the electrical signals passing over the cable. The monitoring device can then detect transmitted data bits and the state of out-of-band control signals.

If the device monitoring signals on the cable is a PC with two serial ports, a first serial port may be wired so that its receive pin is connected to the receive pin on the DTE device. The second port on the PC may be wired so that its receive pin is connected to the receive pin on the DCE device. With this wiring, the PC will be able to receive data flowing in both directions over the serial cable. A special application running on the PC may be used to read the data from its two serial ports simultaneously and provide an analysis of the traffic on the cable.

Note that the transmit pins on the PC's serial ports need not be used since the monitoring PC is only passively monitoring the channel. Also, two serial ports are required since two lines are being received by the monitoring PC and a typical PC serial port only has a single pin for receiving data. The out-of-band control signals on the cable, such as RTS, CTS, RI, etc., can be monitored by connecting them to the appropriate out-of-band control signal input pins on the PC serial ports.

In another configuration, the monitoring device can be a PC with a single serial port that is only connected to the receive pin on the DTE device. This is useful when the DCE device is providing a terminal session and the input from the DTE device is echoed by the DCE device. Using a standard terminal emulator application, the monitoring PC can recreate the information displayed on the DTE device's terminal.

In the present invention, the port tapping function may be duplicated or emulated in the central server. When using communications system 20 described above, information that would be transferred over a cable between a port on a PC and a connected device may pass through central server 22. In addition to forwarding these messages to the other end of the communications link, central server 22 can send a copy of these messages to another destination, such as monitor 170 in FIG. 1. This function would mimic a split or tap in a physical cable. Monitor 170 may be implemented with a PC connected to communication network 28 wherein the PC contains a module similar to client communication module 24. Monitor 170 may be allowed to establish a communication link with central server 22 in a manner similar to the communication link with client communication module 24. Once a communication link is established, monitor 170 may request to monitor communication data transferred between a specific pair of client communication module 24 and remote communication device 26. The monitored link can be existing or established later. For monitor 170 to establish a monitoring connection with the central server, it must have special permission recorded in the server to allow monitoring access in general, and to allow monitoring of with the specific link it wishes to monitor.

Once monitoring begins, monitor 170 will have access to all the signals passing and messages over the communications interface, but will not have the ability to interfere with or create messages between the two main ends of the link. To facilitate existing monitoring software that expects to see two serial ports, software within monitor 170 can create two virtual serial ports and split the signals appropriately between the two ports.

In order to increase the capacity of the number of communication ports that may be simultaneously extended, the present invention may distribute the data communication and data forwarding load by using several central servers 22. A communications system 20 having several central servers 22 may be implemented by allowing client communication modules 24 and remote communication devices 26 to log in to a first central server 22 and thereafter receive instructions to login again to a second central server that will host the communication links and data forwarding tasks. These instructions may be handled by the administration module 62 in central server 22, which may modify the login procedures of client registration module 80 and device registration module 88.

It should be apparent to those persons skilled in the art that the present invention provides a method and system for extending the reach of a communications port on a PC using a general purpose network, even when the remote equipment that is the target of such communication is located behind a firewall that does not permit incoming communication links. An advantage of the present invention is that central server 22 does not require any knowledge or awareness of the format of the application data, nor does the server require any software that specifically accommodates the operation of equipment communication application 34, remote equipment 32, or the interaction or communication between the two. All the particular details of interfacing, controlling, and monitoring the equipment 32 are in client computer 30 embodied in equipment communication application 34 together with any other data or software that the manufacturer of remote equipment 32 has provided for communicating via a communication port and a short communication link, such as a cable.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. In a communications network to which a client computer is connected, the client computer has an equipment communication application for communicating with a local device by way of a hardware local communications port, a method of extending an operation of the local communications port by transferring application data from a client communication module in the client computer to a remote communication device and remote equipment data from the remote communication device to the client communication module wherein the remote communication device is located behind an inbound connection initiation inhibiting firewall, wherein the client communication module is unable to communicate directly with the remote communication device, comprising steps of:

initiating in the remote communication device a request to establish a first communication link between the remote communication device and a central server, wherein said central server can not initiate the establishment of said first communication link because the firewall inhibits an initiation of inbound connections;

authenticating in the central server an identity of the remote communication device in response to the request to establish the first communication link;

authenticating in the remote communication device an identity of the central server;

establishing the first communication link wherein said first communication link is capable of allowing passage of the application data and the remote equipment data;

initiating in the client communication module a request to establish a second communication link between the client communication module and the central server, wherein said second communication link is capable of allowing passage of the application data and the remote equipment data;

authenticating in the central server an identity of the client communication module in response to the request to establish the second communication link;

authenticating an identity of the central server in the client communication module;

establishing the second communication link;

in response to the request by the client communication module, either:

preventing the establishment of an end-to-end communication link between the client communication module and a selected remote communication device when the client communication module does not have associated permission data that grants authority to the requesting client communication module to establish the end-to-end communication link with the selected remote communication device, or establishing an end-to-end communication link between the client communication module and the remote communication device in response to the request by the client communication module when the client communication module does have associated permission data that grants authority to the requesting client communication module to establish the end-to-end communication link with the selected remote communication device;

utilizing the established end-to-end communication link:

receiving in the client communication module the application data from the equipment communication application in the client computer;

receiving in the central server the application data from the client communication module via the second communication link;

forwarding the application data received by the central server via the second communication link to the remote communication device via the first communication link wherein such forwarding does not substantially change the application data;

receiving the application data by the remote communication device and forwarding the application data to a remote equipment;

receiving by the central server the remote equipment data generated by the remote equipment from the remote communication device via the first communication link, wherein said remote equipment data is substantially not derived from said application data;

forwarding the remote equipment data received by the central server via the first communication link to the client communication module via the second communication link wherein such forwarding does not substantially change the application data;

receiving the remote equipment data by the client communication module and forwarding the remote equipment data to the equipment communication application in the client computer; and periodically sending from the remote communication device a packet on the first communication link to the central server when the remote communication device does not otherwise have the remote equipment data ready to be sent on the first communication link.

2. The method of claim 1 wherein the step of preventing the establishment of an end-to-end communication link between the client communication module and a selected remote communication device when the client communication module does not have associated permission data that grants authority to the requesting client communication module to establish the end-to-end communication link with the selected remote communication device further comprises the steps of:

managing in the central server a permissions list comprised of permissions data that indicates whether the client communication module is permitted to establish said end-to-end communication link; and checking in the central server in the permissions list whether the client communication module has permission to establish the end-to-end communication link with the remote communication device.

3. The method of claim 1, further comprising:

recording at least one connected device list parameter in a connected device list in the central server in response to the establishment of the first communication link, wherein the at least one connected device list parameter comprises at least a remote communication device identifier;

allowing access to said connected device list to the client computer.

4. The method of claim 3, wherein the step of allowing access to said connected device list further comprises the step of:

sending to the client computer only those records of the connected device list which pertain to remote communication devices with which the client communication module has permission to communicate.

5. The method of claim 4:

wherein said at least one connected device list parameter further comprises a status of the remote communication device;

wherein the status indicates if the first communication link is established between the remote communication device and the central server:

wherein the first communication link is established if a data packet may be immediately sent from the central server to the remote communication device; and wherein the connected device list comprises connected device list parameters pertaining to one or more remote communication devices.

6. The method of claim 4 wherein said at least one connected device list parameter further comprises an availability of the remote communication equipment for use by the client communication module.

7. The method of claim 1, further comprising the steps of:

transferring over signal lines of a communication interface coupled to the remote equipment, said application data and said remote equipment data using one or more in band signals and out-of-band signals;

wherein the in band signals carry a data stream and the out-of-band signals control one of: the communication interface and the remote equipment;

wherein the out-of-band signals are not transferred on the same signal lines as the in band signals; and transmitting on the end-to-end communication link the state of one or more out-of-band signals.

8. The method of claim 7:

wherein the state of one or more out-of-band signals comprises the state of a signal line of the communication interface that is used for end-to-end flow control; and wherein said end-to-end flow control prevents the sending of the respective one of application data or remote equipment data to an endpoint if an endpoint is not ready to receive it; and wherein the endpoint is one of: the remote equipment or the equipment communication application.

9. The method of claim 1, further comprising the steps of:

communicating a flow control setup to the remote communication device;

using said flow control setup by the equipment communication application for communicating with the remote equipment;
wherein said flow control setup comprises information on at least one of:
if a signal line of a communication interface is used for end-to-end flow control and
if a software handshaking protocol is used for end-to-end flow control and
if end-to-end flow control is used;
wherein said end-to-end flow control prevents the sending of the respective one of application data or remote equipment data to an endpoint if the endpoint is not ready to receive it; and
wherein the endpoint is one of: the remote equipment or the equipment communication application.

10. The method of claim 1, further comprising the steps of:
encoding a network flow control signal in a data packet in a first one of a networked device, wherein a networked device is one of: the client communication module or the remote communication device;
forwarding the data packet to the central server;
forwarding in the central server the data packet to a second one of the networked device;
receiving the data packet in said second networked device;
suspending the transmission of the respective one of application data or remote equipment data in the second networked device if the network flow control signal is an instruction to suspend data transmission; and
transmitting the respective one of application data or remote equipment data in the second networked device if the network flow control signal is an instruction to transmit data.

11. The method of claim 1, wherein the step of initiating in the remote communication device a request to establish a first communication link is performed independently of the step of establishing the second communication link.

12. The method of claim 1, further comprising the step of preventing the transmission of the remote equipment data via the first communication link by the remote communication device until the end-to-end communication link is established.

13. The method of claim 1, further comprising the steps of:
sending a message through the end-to-end communication link from the equipment communication application to the remote communication device, said message comprising a communication port operation parameter; and
communicating in the remote communication device with the remote equipment according to the communication port operation parameter.

14. The method of claim 1, wherein the central server is a secondary central server, further comprising the steps of:
before establishing the end-to-end communication link, logging into a primary central server by the remote communication device;
receiving by the remote communication device from the primary central server a first instruction to log into the secondary central server;
wherein the step of initiating in the remote communication device the request to establish the first communication link between the remote communication device and the secondary central server is in response to the first instruction to log into the secondary central server.

15. The method of claim 14, further comprising the steps of:
before establishing the end-to-end communication link, logging into the primary central server by the client communication module;
receiving by the client communication module from the primary central server a second instruction to log into the secondary central server; and
wherein the step of initiating in the client communication module the request to establish a second communication link between the client communication module and the secondary central server is in response to the second instruction to log into the secondary central server.

16. The method of claim 1 wherein said client computer has a local communication port module which serves as an interface with the equipment communication application, wherein said local communication port module has a virtual communication port that emulates in software the virtues of a physical communication port so that said equipment communication application can communicate with the remote equipment without being modified.

17. The method of claim 1, further comprising the step of:
in response to an initializing of the remote communication device, repeating the steps of initiating in the remote communication device a request to establish a first communication link, authenticating in the central server the identity of the remote communication device, authenticating in the remote communication device the identity of the central server, and establishing the first communication link.

18. The method of claim 1, further comprising the step of:
re-establishing the first communication link in response to re-initializing the remote communication device, repeating the steps of initiating in the remote communication device a request to establish a first communication link, authenticating in the central server the identity of the remote communication device, authenticating in the remote communication device the identity of the central server, and establishing the first communication link.

19. In a communications network to which a client computer is connected, the client computer having an equipment communication application for communicating with a local device by way of a hardware local communications port, a system for extending an operation of the local communications port by transferring application data from a client communication module in the client computer to a remote communication device and remote equipment data from the remote communication device to the client communication module, wherein the remote communication device is located behind an inbound connection initiation inhibiting firewall, wherein the client communication module is unable to communicate directly with the remote communication device, said system comprising:
the remote communication device comprising:
a first network adapter coupled to the communications network for formatting and communicating data via the network;
a device registration module coupled to the first network adapter for initiating the establishment of a first communication link between the remote communication device and a central server, wherein said central server is unable to initiate the establishment of said first communication link because the firewall inhibits an initiation of inbound connections, the device registration module authenticating an identity of the central server in order to establish the first communication link between the remote communication device and the central server;

a device buffering module coupled to the first network adapter for buffering the remote equipment data sent to the central server via the first communication link, and for buffering the application data received from the central server via the first communication link;

a remote communication port module coupled to the device buffering module for sending the application data to a remote equipment, and receiving the remote equipment data from the remote equipment the remote equipment data being directed to an equipment communication port of the remote equipment, the remote communication port periodically sending from the remote communication device a packet on the first communication link to the central server when the remote communication device does not otherwise have the remote equipment data ready to be sent on the first communication link;

the central server connected to the communications network comprising:

a network communication module coupled to the communications network for formatting and communicating data via the communications network;

a server registration module for establishing the first communication link and a second communication link, wherein said server registration module is unable to initiate said first communication link because the firewall inhibits an initiation of inbound connections, the server registration module authenticating an identity of the remote communication device in response to a request for the remote communication device to establish the first communication link and authenticating an identity of the client communication module in response to a request from the client communication module, the server registration module preventing an establishment of an end-to-end communication link between the client communication module and a selected remote communication device when the client communication module does not have associated permission data that grants authority to the requesting client communication module to establish the end-to-end communication link with the selected remote communication device; and a forwarding module coupled to the network communication module for forwarding data received from the first communication link to the second communication link, and forwarding data received from the second communication link to the first communication link;

the client communication module coupled to the client computer comprising:

a second network adapter coupled to the communications network for formatting and communicating data via the network;

a client registration module coupled to the second network adapter for initiating the establishment of the second communication link between the second network adapter and the central server, the client registration module authenticating the identity of the central server in order to establish a second communication link between the client communication module and the central server;

a client buffering module coupled to the second network adapter for buffering the application data sent to the central server via the second communication link, and buffering the remote equipment data received from the central server via the second communication link; and a local communication port module coupled to the client buffering module for sending the remote equipment data to an application operating in the client computer, and receiving the application data from the application, the application data being directed to a selected communication port of the client computer, wherein said client computer has an equipment communication application which serves as an interface with said local communication port module.

20. The system of claim 19 further comprising further comprising:

a remote communication device database in the central server which records administrative data;

wherein the remote communication device database is coupled to the server registration module and the forwarding module; and wherein the administrative data is used with the associated permission data to establish the end-to-end communication link with the selected remote communication device.

21. The system of claim 19 further comprising a remote communication device database in the central server which records in a connected device list the availability of the remote communication device due to the presence of the first communication link, the client computer being allowed to access the connected device list.

22. The system of claim 19 wherein the network communication module only sends to the client computer those records of the connected device list which pertain to remote communication devices with which the client communication module has permission to communicate.

23. The system of claim 19 wherein the application data and the remote equipment data are transferred over the signal lines of a communication interface coupled to the remote equipment, the application data and the remote equipment data using in band signals and out-of-band signals, the in band signals carrying data streams and the out-of-band signals controlling either the communications interface or the remote equipment, the out-of-band signals being transferred on signal lines that are different from the signal lines that transfer the in band signals, and the state of one or more of the out-of-band signals being transmitted over the first and second communication links.

24. The system of claim 19 further comprising a flow control setup used by the equipment communication application for communicating with the remote equipment, the flow control setup comprises information on at least one of: if a signal line of a communication interface is used for end-to-end flow control and if a software hand shaking protocol is used for end-to-end flow control and if an end-to-end flow control is used, wherein the end-to-end flow control prevents the sending of data to an endpoint if the endpoint is not ready to receive it, wherein the endpoint is either the equipment communication application or the remote equipment.

25. The system of claim 19 further comprising a data packet comprising an encoded network flow control signal, the network flow control signal containing instruction to either suspend data transmission or to transmit data by the receiving device, the data packet produced by a first network device and sent to a second network device, wherein the network device is either the client communication module or the remote communication device.

26. The system of claim 19 wherein the central server establishes the first communication link independently of establishing the second communication link.

27. The system of claim 19 wherein said client computer has a said local communication port module which serves as an interface with the equipment communication application, wherein said local communication port module is comprised of a virtual communication port that emulates in software the virtues of a physical communication port so that said equipment communication application can communicate with the remote device without being modified.

* * * * *